United States Patent
Alexander et al.

(10) Patent No.: US 12,468,534 B2
(45) Date of Patent: Nov. 11, 2025

(54) OVERFLOW EVENT COUNTER

(71) Applicant: Graphcore Limited, Bristol (GB)

(72) Inventors: Alan Alexander, Wotton-under-Edge (GB); Dominic Masters, Birmingham (GB)

(73) Assignee: GRAPHCORE LIMITED, Bristol (GB)

( * ) Notice: Subject to any disclaimer, the term of this patent is extended or adjusted under 35 U.S.C. 154(b) by 83 days.

(21) Appl. No.: 18/483,699

(22) Filed: Oct. 10, 2023

(65) Prior Publication Data
US 2024/0118894 A1    Apr. 11, 2024

(30) Foreign Application Priority Data
Oct. 10, 2022 (GB) .................................... 2214877

(51) Int. Cl.
*G06F 9/32* (2018.01)
*G06F 7/499* (2006.01)
*G06F 9/30* (2018.01)

(52) U.S. Cl.
CPC ............ *G06F 9/321* (2013.01); *G06F 9/3001* (2013.01); *G06F 7/4991* (2013.01)

(58) Field of Classification Search
None
See application file for complete search history.

(56) References Cited

U.S. PATENT DOCUMENTS

| | | | |
|---|---|---|---|
| 4,379,338 A * | 4/1983 | Nishitani | G06F 7/5095 708/552 |
| 6,243,731 B1 | 6/2001 | Tessarolo | |
| 7,089,277 B2 * | 8/2006 | Uehara | G06F 7/4991 708/552 |
| 11,216,275 B1 | 1/2022 | James-Roxby | |
| 2019/0339939 A1 | 11/2019 | Ito | |
| 2020/0201600 A1 | 6/2020 | Alexander | |
| 2023/0195420 A1 * | 6/2023 | Yoo | G06F 7/49915 708/200 |

OTHER PUBLICATIONS

Search Report dated Jun. 6, 2023 for United Kingdom Patent Application No. GB2214877.9.

* cited by examiner

*Primary Examiner* — Kaushikkumar M Patel
(74) *Attorney, Agent, or Firm* — HAYNES AND BOONE, LLP

(57) ABSTRACT

A processing device comprises a register configured to store a count value indicating a number of times overflow events have resulted from arithmetic operations performed by the processing device. An execution unit of the device, in response to performing an arithmetic operation having a result which extends beyond one of the predefined limit values for the floating-point format, stores a result value that is within the predefined limit values, and cause the count value to be incremented. The count value provides a performant way of determining the number of overflow events that have occurred during the arithmetic processing performed by the execution unit. The count value provides a metric that provides a measure of the inaccuracy imparted into the results of the application processing by overflow events.

17 Claims, 9 Drawing Sheets

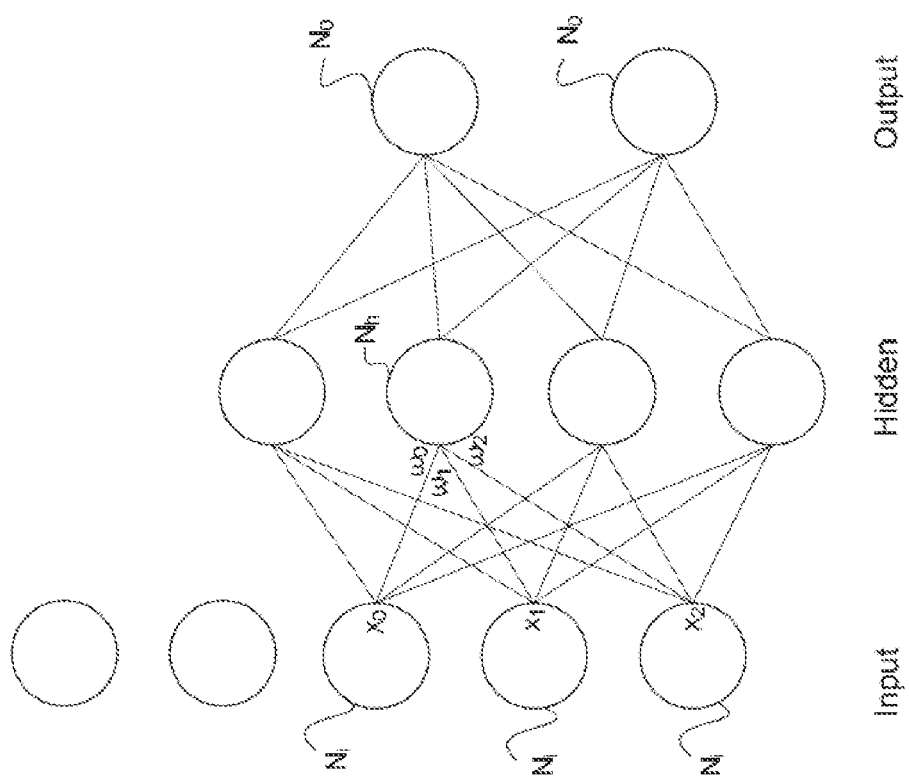

OVERFLOW EVENT COUNTER

CROSS-REFERENCE TO RELATED APPLICATIONS

The present application claims priority to United Kingdom Patent Application No. GB2214877.9, filed Oct. 10, 2022, the disclosure of which is hereby incorporated herein by reference in its entirety.

TECHNICAL FIELD

The present disclosure relates to a processing device and in particular to a processing device having an execution unit configured to perform arithmetic operations using values represented according to a format having predefined limit values.

BACKGROUND

In computing, bit sequences of predefined sizes are used to represent numbers. The particular representation of the bit sequence determines how a bit sequence is interpreted.

One form of representation is the floating-point representation, which is often used to approximately represent real numbers. Floating-point representations are laid out in IEEE Standard 754. The floating-point representation comprises 3 separate components, i.e. a sign component, a mantissa component, and an exponent component. In the so-called single-precision (i.e. 32-bit) floating point representation (according to IEEE Standard 754), the sign component consists of a single bit, the exponent consists of 8 bits, and the mantissa consists of 23 bits. In the so-called half-precision (i.e. 16-bit) floating-point representation (according to IEEE standard 754), the sign component consists of a single bit, the mantissa consists of 10 bits, and the exponent consists of 5 bits. In most cases, a number is given from these 3 components by the following formula:

$$(-1)^{signbit} \times I.\text{mantissa} \times 2^{exponentbits\text{-}offset}$$

The displayed "offset" to the exponent is dependent upon the range of values required. IEEE 754 has chosen values as follows. In the single-precision representation, the offset is equal to 127. In the half-precision format, the offset is equal to 15.

Here "I" is an implicit bit, which is derived from the exponent. In the case that the exponent bit sequence consists of anything other than all zeros or all ones, the implicit bit is equal to one and the number is known as a normal (abbreviated to "Norm" herein). In this case, the floating point number is given by:

$$(-1)^{signbit} \times 1.\text{mantissa} \times 2^{exponentbits\text{-}offset}$$

In the case that the exponent bit sequence consists of all zeros, the implicit bit is equal to zero and the number is known as denormalised or subnormal (abbreviated to "denorm" herein) "denorm". In this case, the floating point number is given by:

$$(-1)^{signbit} \times 0.\text{mantissa} \times 2^{exponentbits\text{-}offset}$$

The denorms are useful, since they allow smaller numbers to be represented than would otherwise be representable by the limited number of exponent bits.

The other circumstance—in which the exponent bit sequence consists of all ones—may be used to represent special cases, e.g. ±infinity or NaN. NaN (Not a Number) is a numeric data type value representing an undefined or unrepresentable value. The presence of a NaN in the results of a calculation is often taken to signal an exception. In any event, subsequent steps in a calculation cannot be carried out.

Table 1 summarises how the floating point numbers are interpreted for different ranges of the exponent and the mantissa according to the IEEE 754 standard.

TABLE 1

| Exponent | Mantissa Zero | Mantissa non-zero |
|---|---|---|
| $00_H$ | zero, −0 | denormal numbers |
| $01_H, \ldots, FE_H$ | | normalized value |
| $FF_H$ | ±infinity | NaN (quiet, signalling) |

As shown in table 1, if the exponent consists of all zeros, and the mantissa consists of all zeros, the floating point number is taken to be equal to zero (either +0, −0). If the exponent consists of all zeros and the mantissa is non-zero, the floating point number is a denorm. If the exponent consists of all ones and the mantissa consists of all zeros, the floating point number is taken to represent ±infinity. If the exponent consists of all ones and the mantissa is non-zero, the floating point number is taken to be equal to NaN. In the case that the exponent is anything other than all zeros and all ones, the floating point number is a norm. The IEEE standard lays out a number of different NaN codes, represented by different mantissa values.

Beyond the IEEE standard, there is a drive to provide processors that are adapted for performing operations with floating point numbers having fewer bits (e.g. 8 bits) than those available in the IEEE single precision and half-precision formats. Although there is a likely reduction in the range and precision provided by such formats, there is the advantage that each individual floating-point number requires reduced storage space in memory and in the processor registers. Additionally, due to the reduced number of mantissa and exponent bits that must be handled, each such number is less demanding in terms of the circuitry required to process the number. Since the logic required to process each FP value is less demanding, it is possible to provide more instances of that logic and therefore increase the performance of the processor as measured by floating-point operations per cycle.

Table 2 summarises how the floating-point numbers are interpreted for different ranges of the exponent and the mantissa according to a proposed standard for FP8 numbers.

TABLE 2

| Sign | Exponent | Mantissa | Interpretation |
|---|---|---|---|
| 0, 1 | $01_H, \ldots, FF_H$ | $00_H, \ldots, FF_H$ | Normal numbers |
| 0, 1 | $00_H$ | $01_H, \ldots, FF_H$ | Denorms |
| 0 | $00_H$ | $00_H$ | Unsigned Zero |
| 1 | $00_H$ | $00_H$ | Nan |

Floating point formats may be used to represent numbers in implementations of neural network processing. An implementation of neural networks involves the storage and manipulation of such floating point numbers. Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason, the nodes are often referred to as artificial neurons or simply neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights.

FIG. 1 shows a simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node of the input layer Ni is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node Nh are labelled w0 . . . w2. Each node in the input layer is connected at least initially to at least one node in the hidden layer. At least one node in the hidden layer can perform an activation function on the data which is provided to them and can generate similarly an output vector which is supplied to one or more nodes $N_O$ in the output layer $N_O$. Each node weights its incoming data, for example by carrying out the dot product of the input activations of the node and its unique weights for the respective incoming links. It then performs an activation function on the weighted data. The activation function can be for example a sigmoid. See FIG. 1A. The network learns by operating on data input at the input layer, assigning weights to the activations from each node and acting on the data input to each node in the hidden layer (by weighing it and performing the activation function). Thus, the nodes in the hidden layer operate on the weighted data and supply outputs to the nodes in the output layer. Nodes of the output layer may also assign weights. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back propagated error and produces a revised set of weights. In this way, the network can be trained to perform its desired operation.

SUMMARY

Certain calculations, such as floating-point vector summation, may cause the value of a floating point result to overflow, i.e. the result of the calculation exceeds the maximum or minimum representable value in the floating point format. One response to an overflow event is to cause the generation of a bit string representing a NaN or an inf. These values are useful for debugging, since they indicate where the overflow has occurred. However, they do not provide useful numerical results and, since they cannot be processed as numbers, cannot be subject to further processing to generate useful numerical results.

According to a first aspect, there is provided a processing device comprising: an execution unit configured to execute instructions to perform arithmetic operations on input values represented according to a format, the format having a range of representable values extending between predefined limit values; and a first register configured to store a count value indicating a number of times overflow events have occurred when the processing device performs the arithmetic operations, wherein the execution unit is configured to, in response to performing a first of the arithmetic operations having a result which extends beyond one of the predefined limit values: store a result value that is within the predefined limit values; and cause the count value to be incremented.

By providing a value within the predefined limits, a useful numerical result is produced that can be subject to subsequent processing to generate further numerical results. However, approximating the result in this way introduces a certain amount of inaccuracy. For many applications, the inaccuracy introduced may be tolerable, providing that the number of overflow events does not become too large. For example, in the case of training a neural network, it is found that the training may tolerate a certain amount of overflow. However, if the number of overflow events becomes too large, the network may fail to converge. In order to determine whether application processing is subject to an intolerable level of overflow, it is helpful to determine how many overflow events have occurred. Therefore, a count value is maintained in a register of the processing device and is incremented in response to each overflow event that occurs due to the processing performed by the processing device. This count value provides a performant way of determining the number of overflow events, which provides a metric for measuring the level of inaccuracy imparted into the results of the application processing by the overflow events.

In some embodiments, the stored result value is equal to one of the predefined limit values.

In some embodiments, each of the instructions is associated with a respective thread of a plurality of worker threads, wherein the execution unit is configured to, for each of the plurality of worker threads: cause the count value to be incremented in response to a respective one of the arithmetic operations associated with the respective thread, the respective one of the arithmetic operations having a result which extends beyond one of the predefined limit values.

In some embodiments, the execution unit is further configured to interleave execution of a supervisor thread with the plurality of worker threads, wherein the first register is a status register of the supervisor thread.

In some embodiments, the format is a first floating-point format consisting of one of: an 8-bit floating point format; a 16-bit floating point format; and a 32-bit floating point format.

In some embodiments, the execution unit is configured to execute further instructions to perform further arithmetic operations using values represented according to a further format, the further format having a further range of representable values extending between further predefined limit values; in response to performing a first of the further arithmetic operations having a further result which extends beyond one of the further predefined limit values: store a further result value that is within the further predefined limit values; and cause the count value to be incremented.

In some embodiments, the second format is a second floating point format consisting of one of: an 8-bit floating point format; a 16-bit floating point format; and a 32-bit floating point format.

In some embodiments, the instructions are part of an application for performing training of a neural network.

In some embodiments, the processing device comprises a second register, wherein the execution unit is configured to: support a thread configured to write to the second register; and in response to the write to the second register, clear the count value.

In some embodiments, the processing device comprises a third register, wherein the execution unit is configured to: support a thread configured to write to the third register; and in response to the thread writing to the third register, enabling the incrementation of the count value in response to the arithmetic operations producing results which extend beyond the predefined limit values.

According to a second aspect, there is provided a processing system comprising a plurality of instances of the processing device according to any preceding claim, wherein for each of the instances: the execution unit of the respective instance is configured to cause a current value of the respective count value to be exported from the respective instance of the processing device.

In some embodiments, the processing system comprises a further processing device comprising: an interface configured to receive from each of the instances of the processing device, the respective count value for that instance; and at least one processor configured to sum the count values of the instances to determine a count of the number of overflow events in the processing system.

In some embodiments, the at least one processor is configured to compare the count of the number of overflow events in the processing system to a threshold.

In some embodiments, the further processing device is a host device.

In some embodiments, the plurality of instances of the processing device are configured to run an application to perform training of a neural network.

According to a third aspect, there is provided a method implemented in a processing device, the method comprising: executing instructions to perform arithmetic operations on input values represented according to a format, the format having a range of representable values extending between predefined limit values; and storing in a first register, a count value indicating a number of times overflow events have occurred when the processing device performs the arithmetic operations, in response to performing a first of the arithmetic operations having a result which extends beyond one of the predefined limit values: storing a result value that is within the predefined limit values; and causing the count value to be incremented.

In some embodiments, the stored result value is equal to one of the predefined limit values.

In some embodiments, each of the instructions is associated with a respective thread of a plurality of worker threads, wherein the method comprises, for each of the plurality of worker threads: causing the count value to be incremented in response to a respective one of the arithmetic operations associated with the respective thread, the respective one of the arithmetic operations having a result which extends beyond one of the predefined limit values.

In some embodiments, the method comprises interleaving execution of a supervisor thread with the plurality of worker threads, wherein the first register is a status register of the supervisor thread.

In some embodiments, the format is a first floating-point format consisting of one of: an 8-bit floating point format; a 16-bit floating point format; and a 32-bit floating point format.

In some embodiments, the method comprises executing further instructions to perform further arithmetic operations using values represented according to a further format, the further format having a further range of representable values extending between further predefined limit values; in response to performing a first of the further arithmetic operations having a further result which extends beyond one of the further predefined limit values: store a further result value that is within the further predefined limit values; and cause the count value to be incremented.

In some embodiments, the second format is a second floating point format consisting of one of: an 8-bit floating point format; a 16-bit floating point format; and a 32-bit floating point format.

In some embodiments, the instructions are part of an application for performing training of a neural network.

In some embodiments, the method comprises: supporting a thread configured to write to the second register; and in response to the thread writing to the second register, clearing the count value.

In some embodiments, the method comprises: supporting a thread configured to write to the third register; and in response to the thread writing to the third register, enabling the incrementation of the count value in response to the arithmetic operations producing results which extend beyond the predefined limit values.

According to a fourth aspect, there is provided a method implemented in a processing system comprising a plurality of instance of the processing device, the method comprising: performing the method according to the third aspect in each of the plurality of instances of the processing device; and at each of the instances, exporting a current value of the respective count value.

In some embodiments, the method comprises: receiving at a further processing device, from each of the instances of the processing device, the respective count value for that instance; and summing the count values of the instances to determine a count of the number of overflow events in the processing system.

In some embodiments, the method comprises comparing the count of the number of overflow events in the processing system to a threshold.

In some embodiments, the further processing device is a host device.

In some embodiments, the method comprises the plurality of instances of the processing device running an application to perform training of a neural network.

According to a fifth aspect, there is provided a computer program comprising a set of computer readable instructions, which when executed by at least one processor, causes a method according to the third aspect or any embodiment thereof to be carried out.

In some embodiments, the computer program comprises a plurality of sets of computer readable instructions according to the fifth aspect, wherein the sets of computer readable instructions are configured to, when each is executed by respective processing device, cause a method according to the fourth aspect or any embodiment thereof to be carried out.

According to a sixth aspect, there is provided a non-transitory computer readable medium storing the computer program according to the fifth aspect or any embodiment thereof.

BRIEF DESCRIPTION OF THE DRAWINGS

To assist understanding of the present disclosure and to show how embodiments may be put into effect, reference is made by way of example to the accompanying drawings in which:

FIG. 1 is a highly simplified schematic view of a neural net;

DETAILED DESCRIPTION

Embodiments are implemented in a processing device, which may take the form of a tile of a multi-tile processing unit. An example of such a multi-tile processing unit is described in detail in U.S. application Ser. No. 16/276,834, which is incorporated by reference.

Figure 1A:
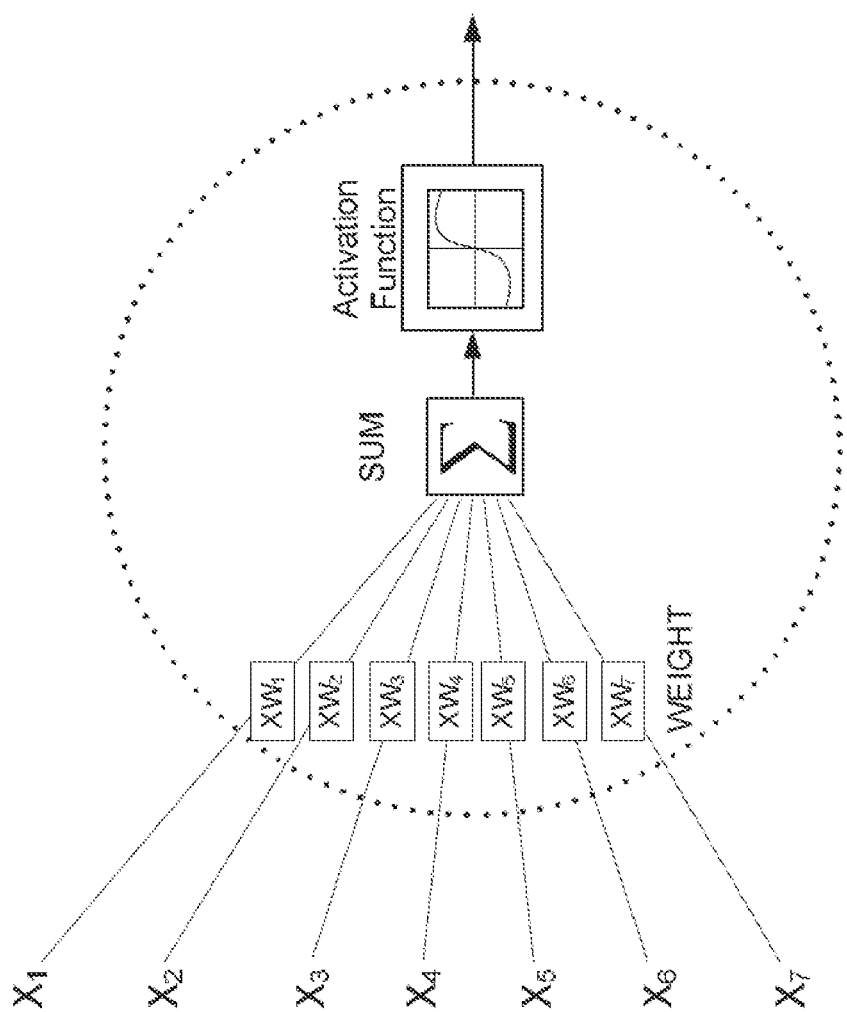
FIG. 1A is a highly simplified schematic view of an artificial neuron.
Figure 2:
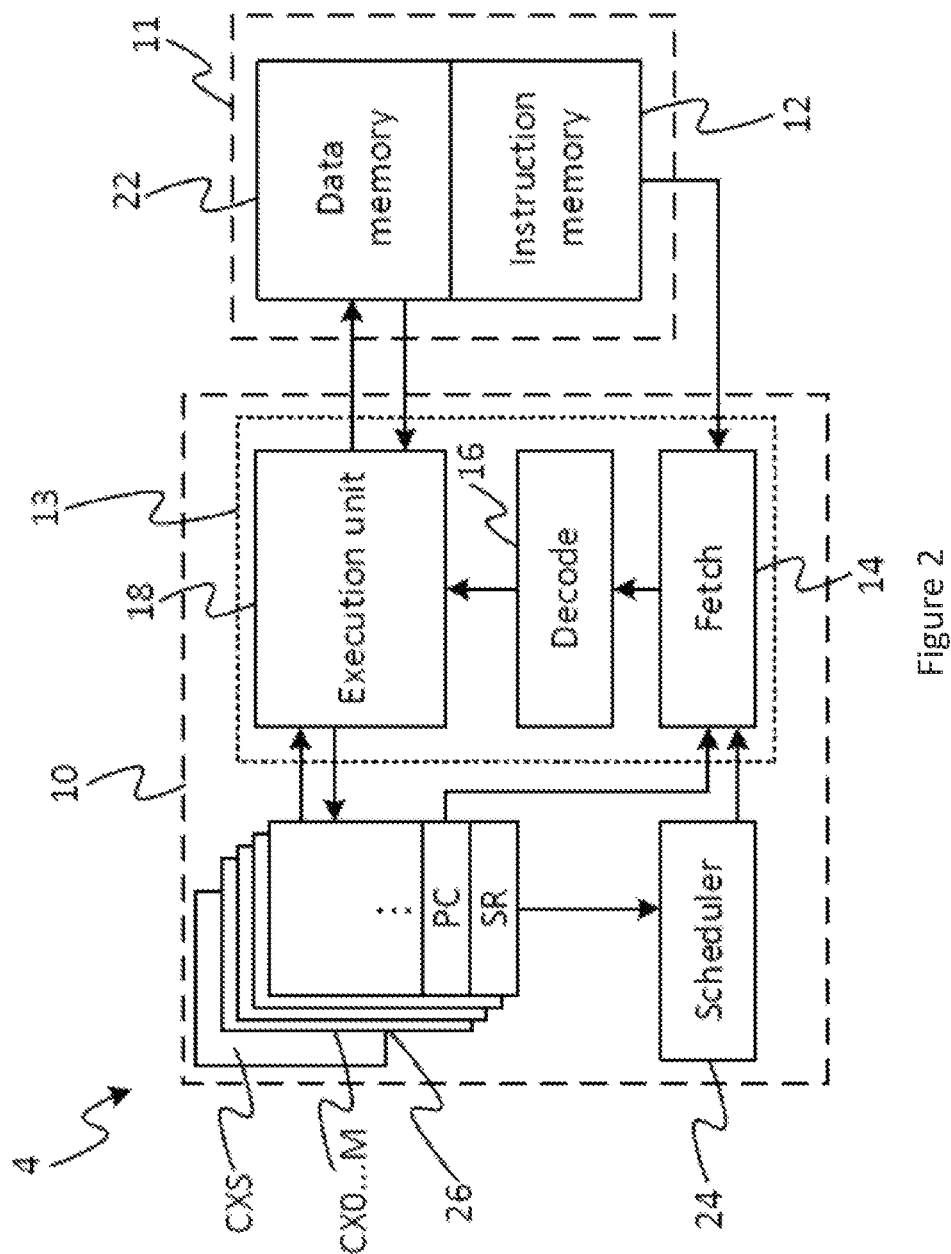
FIG. 2 is a schematic block diagram of a multi-threaded processor.

FIG. 2 illustrates an example of a processing device 4 in accordance with embodiments of the present disclosure.

The processing device 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations). The code contained in the instruction memory 12 is application code for an application that is executed at least partly on the processing device 4.

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The processing unit 10 interleaves execution of a plurality of worker threads, and a supervisor subprogram, which may be structured as one or more supervisor threads. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. (N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another).

Figure 4:
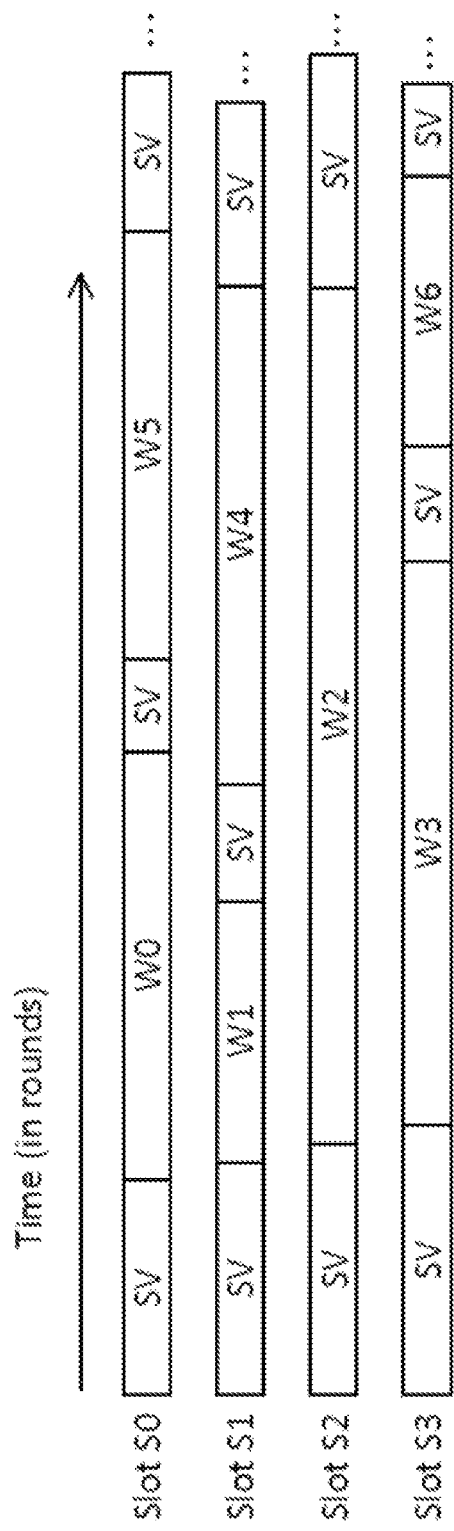
FIG. 4 schematically illustrates a supervisor thread and a plurality of worker threads running in a plurality of interleaved time slots.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. FIG. 4 illustrates an example as to how the threads may be scheduled for execution in the processing unit 10. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture.

Figure 3:
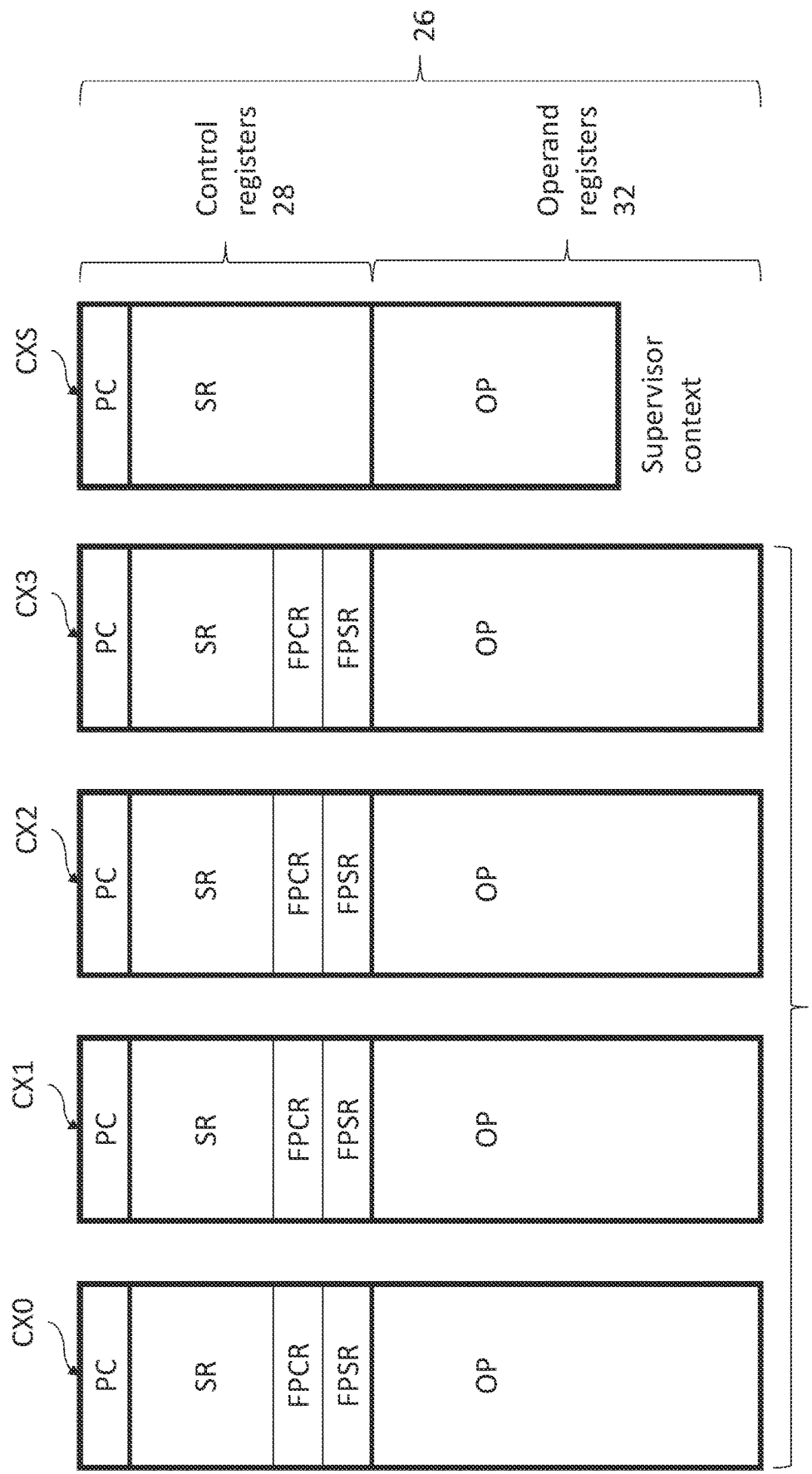
FIG. 3 is a schematic block diagram of a plurality of thread contexts.

An example of the registers making up each of the context register files 26 is illustrated schematically in FIG. 3. Each of the context register files 26 comprises a respective one or more control registers 28, comprising at least a program counter (PC) for the respective thread (for keeping track of the instruction address at which the thread is currently executing) and a set of one or more status registers (SR) recording a current status of the respective thread (such as whether it is currently running or paused, e.g. because it has encountered an error). In embodiments of the present invention, the control registers 28 of the worker contexts include a floating-point control register FPCR and a floating-point status register FPSR. The control registers 28 of the supervisor context include registers for storing the overflow count value and for controlling the counting of overflow events. Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

As noted above, many computer calculations involve the use of floating-point numbers to represent real numbers. The instructions in instruction memory 12 defined by a particular thread may be executed by the execution unit 18 to perform arithmetic operations using floating point numbers. The result of these calculations using floating point numbers are output into the operand registers 32 before being stored in data memory 22.

The processing device 4 supports a number of floating-point number formats on which the execution unit 18 is configured to perform operations. The processing device 4 supports, for example, scalar floating-point number formats, including single-precision and half-precision floating point formats. The processing device 4 also supports an 8-bit floating point precision format. The execution unit 18 may perform a variety of different arithmetic operations using such scalar floating-point number formats according to the instructions included in the instruction memory 12, with the results being stored in data memory 22. The device 4 also supports vector floating-point number formats, including vectors of different lengths of single-precision floating point numbers, half-precision floating point numbers, or 8-bit floating point numbers. The execution unit 18 may perform a variety of different arithmetic operations—such as addition or accumulation operations—using such vectors of floating-point numbers.

Although only one execution unit 18 is shown in FIG. 2, the processing unit 10 may contain multiple execution units, each of which is responsible for performing a different type of operation. For example, one execution unit may perform arithmetic operations on floating-point numbers, whereas another execution unit may perform load/store operations. Reference herein to operations being performed by execution unit 18 are understood to refer to operations being performed by any of the execution units of the processing device 4.

When the execution unit 18 executes instructions to perform arithmetic operations, in some cases the results of those operations may exceed the predefined limits defined for the floating-point format in which the input values are provided and in which the result is to be stored. In other words, the magnitude of the result exceeds the largest magnitude value representable in that floating-point format. Such a condition is referred to as an overflow event. The predefined limits are specific to the particular floating-point format used for the arithmetic operations. According to the IEEE 754 standard, the largest value representable (i.e. the upper limit) in the single-precision (i.e. 32 bit) floating point format is approximately $3.403 \times 10^{38}$, and the smallest value representable (i.e. the lower limit) is approximately $-3.403 \times 10^{38}$. If, when arithmetic operations are performed on one or more single-precision FP values, a result is generated that falls outside of the range defined by these predefined limits, then an overflow event is said to have occurred. In the IEEE half-precision format, the largest representable value is +65504, whereas the smallest representable value is −66504. If, when arithmetic operations are performed on one or more half-precision FP values, a result is generated that falls outside of the range defined by these predefined limits, then an overflow event is said to have occurred. Similar predefined limits, outside of which overflow events occur, are also defined for 8-bit floating point formats, with the limits depending upon how the available bits are shared between the exponent and mantissa.

According to embodiments of the application, the execution unit 18 is configured to handle overflow events by outputting a result that is within the predefined limit values defined for the floating-point format used for the arithmetic operation. Preferably, the result is set equal to one of the limit values. For example, supposing a calculation is performed on half-precision FP numbers and produces a result that is greater than the upper limit value, i.e. 65504, for the half-precision format. In this case, the execution unit 18 stores as the result of the calculation, the upper limit value, i.e. 65504. On the other hand, supposing the calculation performed on half-precision FP numbers produces a result that is less than the lower limit value for the format. In this case, the execution unit 18 stores as the result of the calculation, the lower limit value, i.e. −65504.

One of the registers 26 of the processing device 4 stores an overflow count value, which provides an indication of how many times during execution of an application, overflow events result from the arithmetic operations performed by the execution unit 18. This count value may be reset at the start of application execution, and incremented in response to each overflow event occurring on the processing device 4. This overflow count value is stored in one of the control registers 28 of the supervisor thread.

Figure 5:
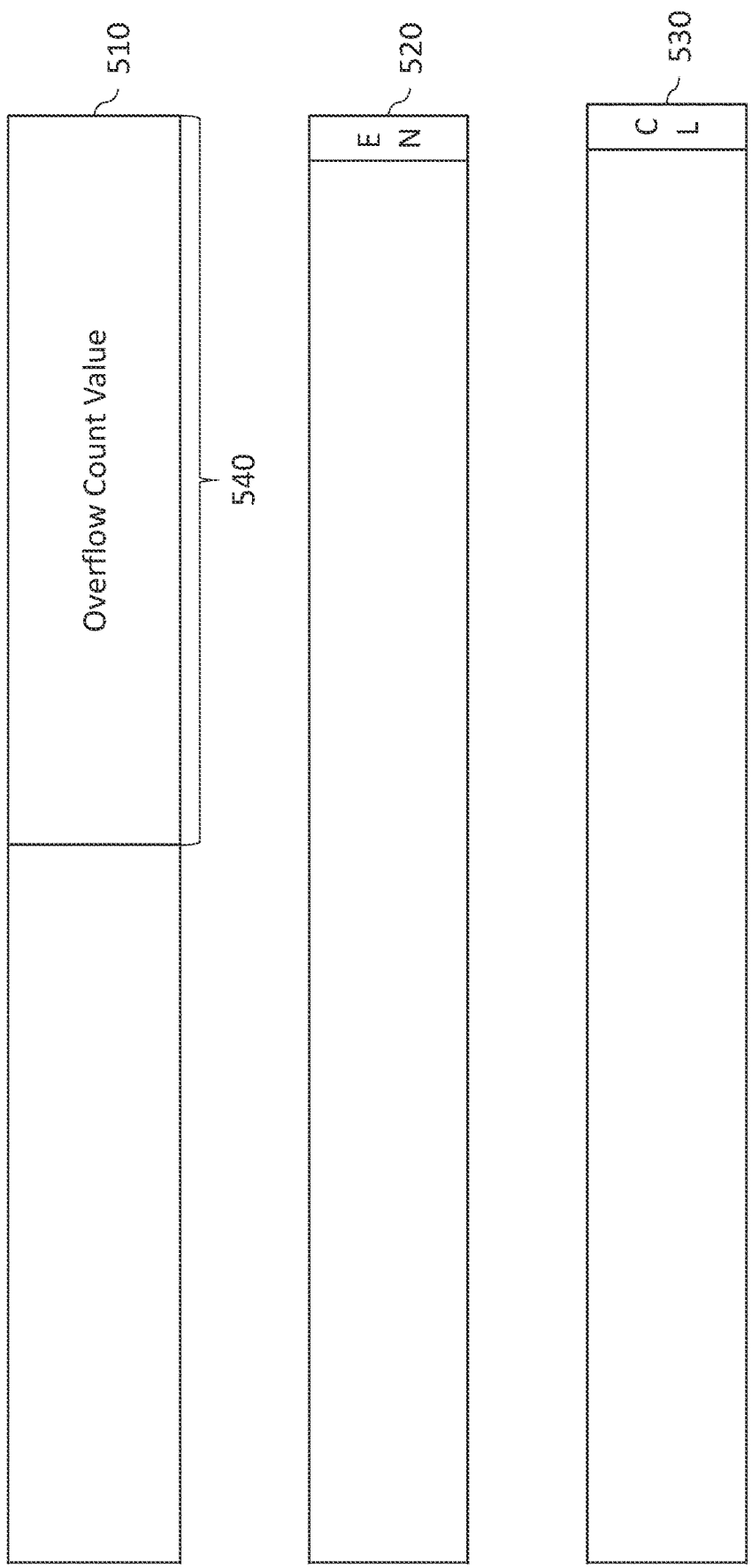
FIG. 5 schematically illustrates status registers of the supervisor thread.

Reference is made to FIG. 5, which illustrates in more detail an example of certain ones of the control registers 28 of the supervisor thread that store information relating to the counting of overflow events.

A first register 510 stores the overflow event count value 540. In examples, the overflow count value 540 comprises a set of 16 bits. The processing device 4 stores one copy of the overflow count value 540, which is shared between the worker threads that execute on the processing device 4. Whenever any of the worker threads performs an arithmetic operation that results in an overflow event, circuitry of the execution unit 18 causes overflow count value 540 to be incremented by one.

A second register 520 stores an enable bit, which is written to by the supervisor thread to enable the counting of overflow events. The supervisor thread sets the enable bit (e.g. by setting it to one) to enable the counting of overflow events at the start of an application, so that any overflow events that occur during execution of the application are counted. When the supervisor thread writes to register 520 to set the enable bit such that counting of overflow events is enabled, this same value is copied to control registers 28 of each of the worker threads. When the worker threads execute and perform arithmetic operations, the overflow count value 540 may or may not be incremented in dependence upon the value of the enable bit. When a worker thread performs an arithmetic operation that results in a value exceeding the limit value for the FP format, if its enable bit is set to indicate that the counting of overflow events is enabled, then the execution unit 18 increments the overflow count value 540. On the other hand, when a worker thread performs an arithmetic operation that results in a value exceeding the limit value for the FP format, if its enable bit is set to indicate that the counting of overflow events is disabled, then the execution unit 18 does not increment the overflow event counter 540.

A third register 530 stores a clear bit, which is written to by the supervisor thread to cause the clearing of the overflow count value 540. When the supervisor thread sets the clear bit (e.g. by setting it to one) to indicate that the overflow count value 540 should be cleared, the execution unit 18 causes zeroes to be written to the overflow count value 540, such that the value 540 is reset.

Figure 6:
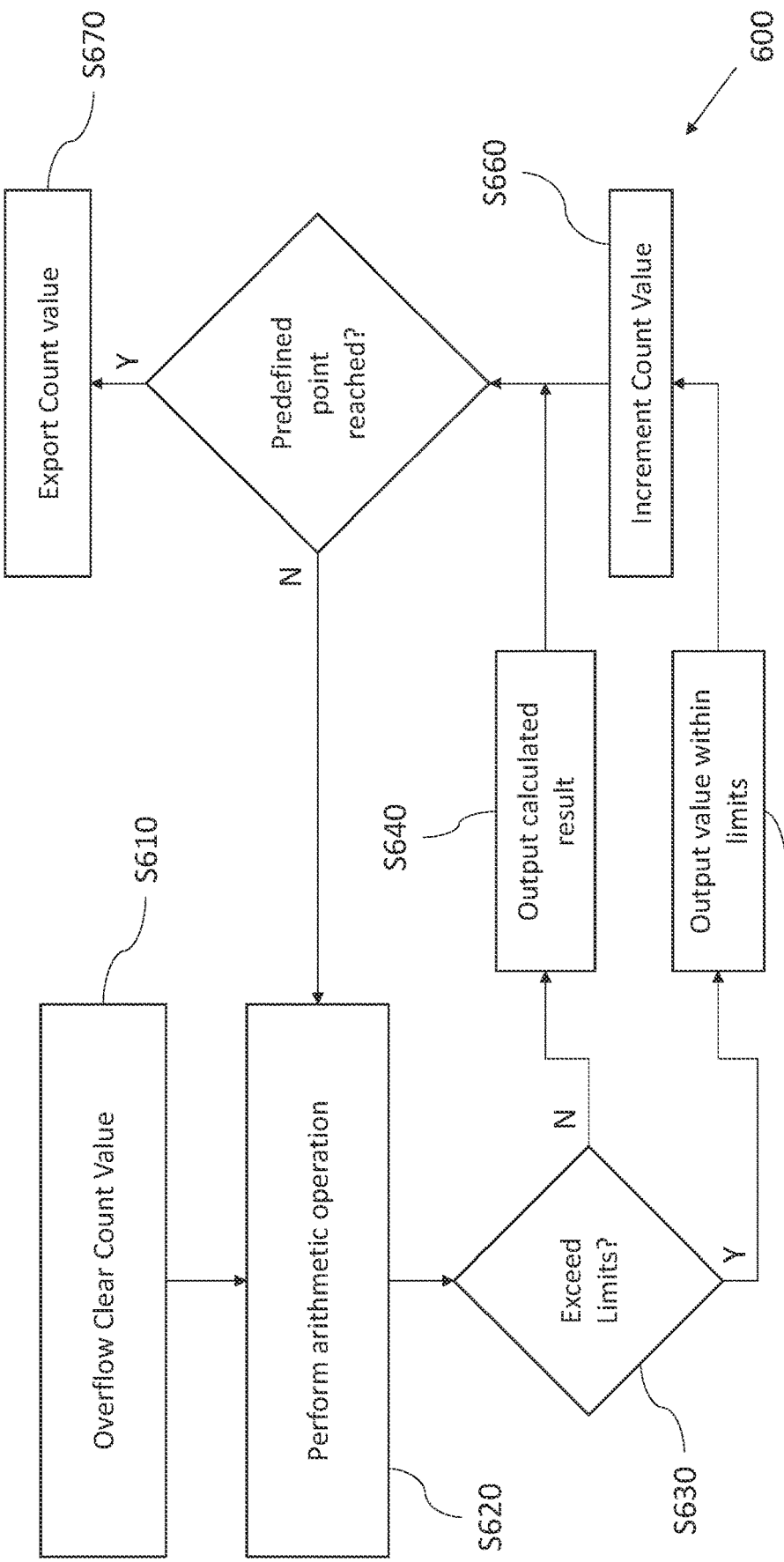
FIG. 6 schematically illustrates a method according to embodiments of the application.

Reference is made to FIG. 6, which illustrates an example of a method 600 performed by the processing device 4 during application execution.

At S610, prior to execution of the arithmetic instructions that forms part of the application, the overflow count value 540 is cleared (i.e. written to zero). This is achieved by the execution unit 18 writing zeros to the overflow count value 540 held in the register 510.

At S620, the execution unit 18 executes an instruction to perform an arithmetic operation, taking one or more floating-point numbers as operands. These input floating-point numbers are provided according to a floating-point format, which may be a 32-bit format, a 16-bit format, or an 8-bit format. The execution unit 18 generates a result of the arithmetic operation. The result may be generated in an intermediate format comprising more bits than the number of bits belonging to the floating-point format in which the input floating-point values were expressed. The consequence is that the intermediate format is capable of expressing values that would be out of range in this input floating-point format.

At S630, the execution unit 18 checks whether the result generated by S620 is out of the representable range of the input floating-point format, in which the result of the arithmetic operation is to be stored in the operand registers 32. This step comprises determining whether or not the result exceeds the upper limit of the range of values that may be expressed in the floating-point format or whether it is less than the lower limit of the range of values that may be expressed in the floating-point format. If the result value is within the predefined limits for the floating-point format, the method proceeds to S640. If the result value falls outside of the predefined limits for the floating-point format, the method proceeds to S650.

At S640, the execution unit 18, in response to determining that the calculated result falls between the predefined limit values defined for the floating-point format in which the result is to be expressed, uses the calculated value determined at S620 as the result of the arithmetic operation. A rounding and conversion step may be carried out by the execution unit 18 in order to provide the result value in the same floating-point format in which the input values were provided. The result is then stored in the operand registers 32 of the worker thread that executed the instruction, from where it may be stored to data memory 22 or used in subsequent arithmetic operations performed by the execution unit 18.

At S650, the execution unit 18, in response to determining that the calculated result falls outside of the predefined limit values defined for the input floating-point format, provides as the result of the arithmetic operation, a value within those limits. Preferably, this comprises providing as the result, one of the limit values for that format. For example, if the calculated result is greater than the maximum representable value for the floating-point format, the result of the arithmetic operation is provided as the maximum representable value in that floating-point. On the other hand, if the calculated result is less than the minimum representable value for the floating-point format, the result of the arithmetic operation is provided as the lowest representable value in that floating-point format.

At S660, as a result of determining (at S630) that the calculated result falls outside predefined limits, the execution unit 18 increments the overflow count value 540 by one.

If the execution unit 18 has reached a predefined export point in its compiled code held in instruction memory 12, it proceeds to S670 at which it causes the current value of the overflow count value 540 to be exported from the processing device 4. In some embodiments, this step is performed at the end of application execution. In other embodiments, this step may be performed at multiple points during execution of the application.

If the execution unit 18 has not reached a point in its compiled code at which the count value is to be exported, the method proceeds again to S620, at which a further instruction for performing a further arithmetic operation may be executed.

When further arithmetic operations are performed by the execution unit 18, these further arithmetic operations may or may not operate on values provided according to the same floating-point format as earlier arithmetic operations. In other words, the execution unit 18 is operable to perform arithmetic operations on floating-point numbers provided according to different formats. The overflow count value 540 may be shared between the different formats, such that overflow events resulting from arithmetic operations in any of those different formats cause the execution unit 18 to increment the count value 540.

Supposing that, for the first arithmetic operation discussed above with respect to FIG. 6, an overflow event occurs, and steps S650 and S660 are performed. When the method 600 again arrives at S620, the execution unit 18 may execute a further instruction to perform a second arithmetic operation, where the second arithmetic operation operates on one or more input floating point numbers provided according to a different format than the one or more input floating point numbers on which the first arithmetic operation was performed. If the second arithmetic operation produces a result that exceeds the predefined limits defined for the different format, then the overflow count value 540 is again incremented by one.

Figure 7:
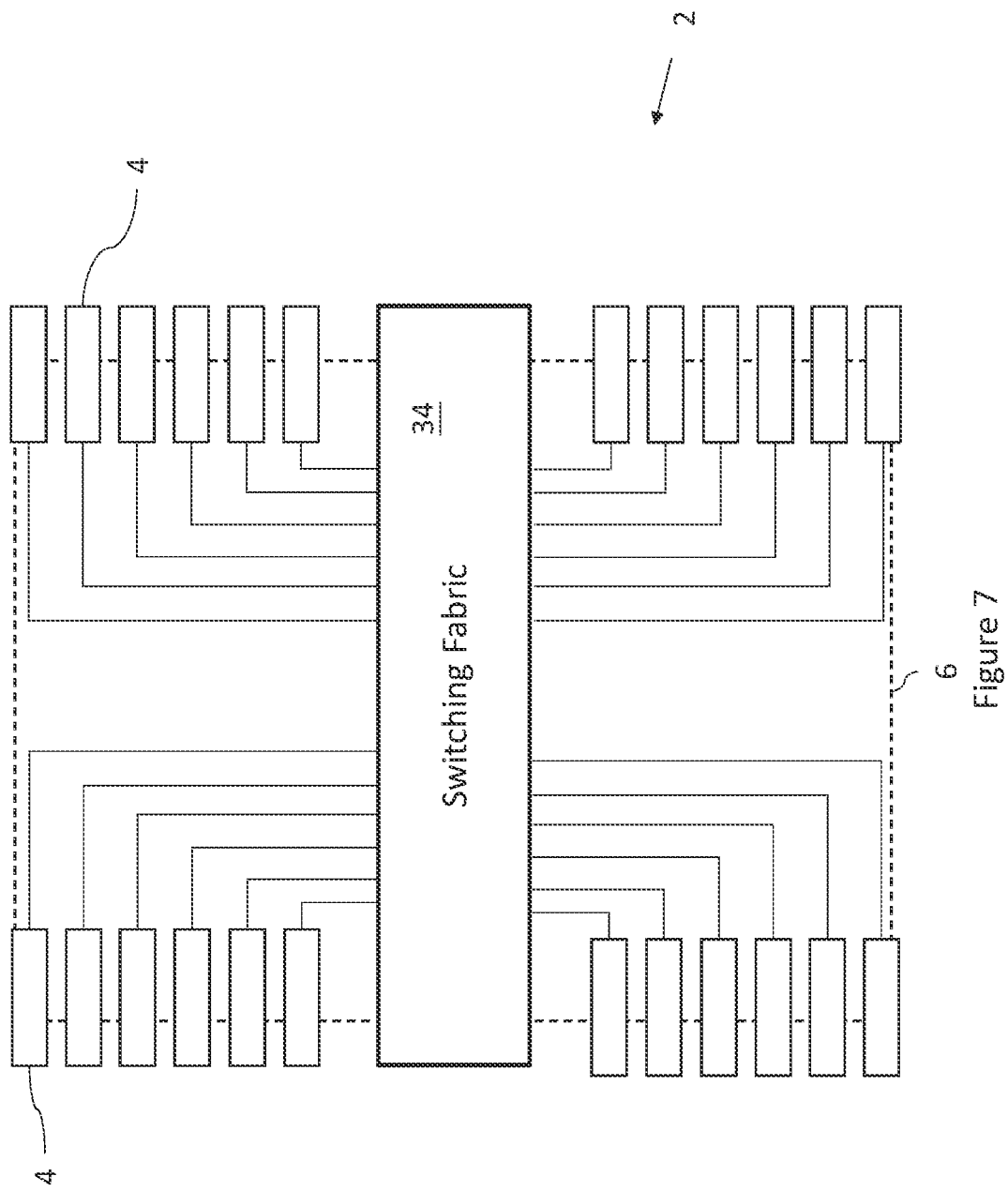
FIG. 7 schematically illustrates a multi-tile processing unit according to embodiments of the application.

In some embodiments, the processing device 4 takes the form of a tile 4 belonging to a multi-tile processing unit. Reference is made to FIG. 7, which illustrates an example of such a multi-tile processing unit 2.

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit 18 and memory 11. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links, enabling the processing unit 2 to be connected to one or more other processing units (e.g. one or more other instances of the same processing unit 2). These external links may enable the processing unit 2 to be connected to: a host system; and one or more other instances of the processing unit 2 on the same IC package or card, or on different cards. The processing unit 2 receives work from the host, in the form of application data which it processes.

Multiple such processing units 2 may together perform processing for an application. The application is supported across these processing units 2.

Figure 8:
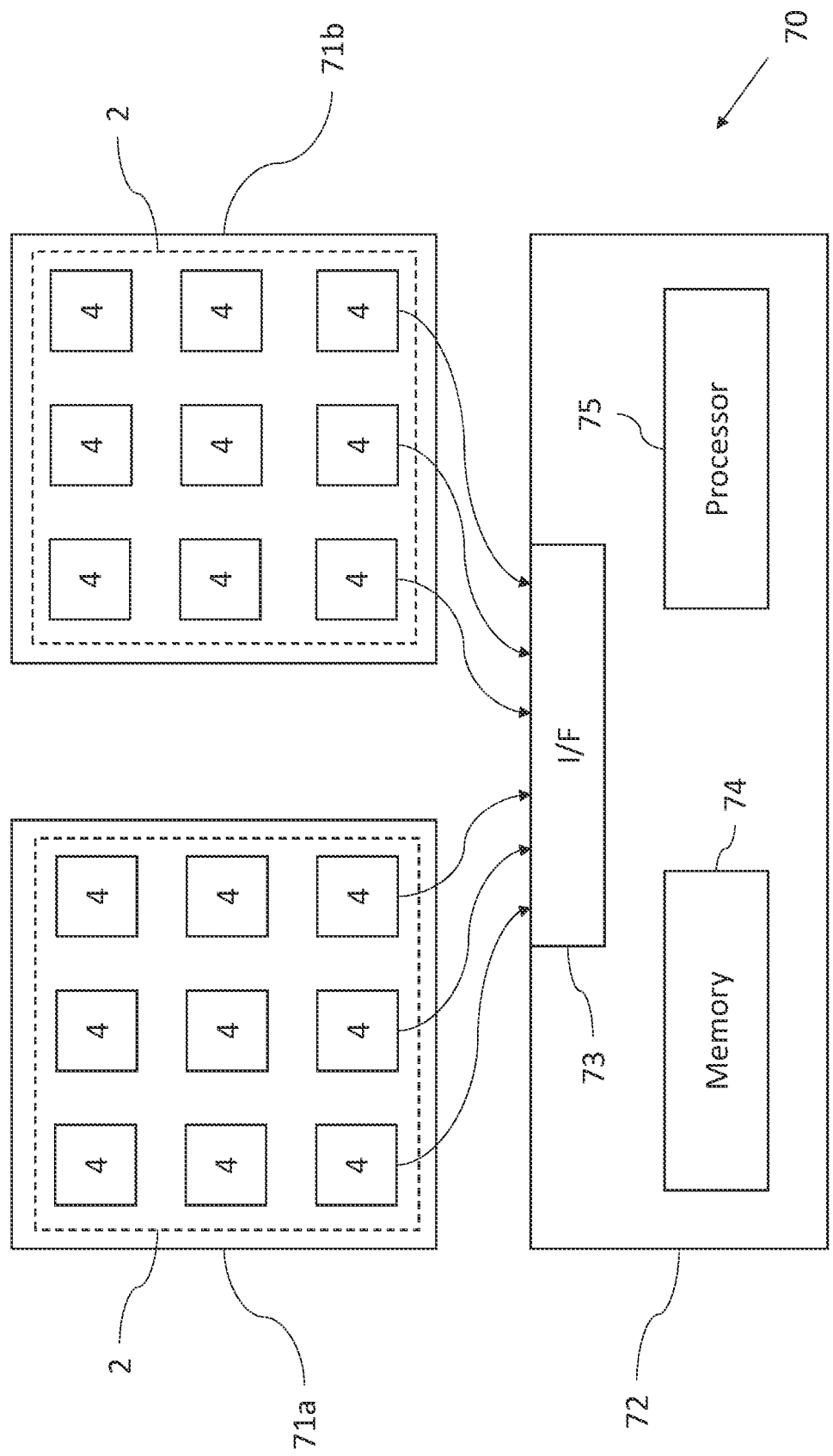
FIG. 8 schematically illustrates a processing system according to embodiments of the application.

Reference to FIG. 8, which illustrates a data processing system 70 comprising multiple processor chips 71*a*, 71*b*. Each of the chips 71*a*, 71*b* comprises a processing unit 2 having multiple processor tiles 4. Each of the processor tiles 4 is an instance of the processing device 4 discussed above and stores in its instruction memory 12 part of the code for the application, which provides a local program for that tile 4. Over the course of execution of the application, communication to exchange application data occurs between the tiles 4, including communication between tiles 4 belong to different chips 71a, 71b. The application executed on the tiles 4 of the system 70 may be an application to train a neural network.

Each such processor tile 4 is configured to record a count value during its processing, where that count value indicates the number of overflow events that have occurred during processing by the respective tile 4. The data processing system 70 comprises a further data processing device 72, which may be a host device 72. The further data processing device 72 receives the count values export from the tiles 4 of the processing units 2. As discussed above with respect to FIG. 6, the tiles 4 are configured to export the count values when they reach a predefined point in their respective code. This predefined point may be at the end of the application. For simplification, only some of the tiles 4 are shown exporting count values to the further data processing device 72. However, in practice all of the tiles 4 running code of the application would export such count values.

The count values are received at an interface 73 of the further data processing device 72. The processor 75 of the further data processing device 72 causes these count values to be stored in the memory 74. The processor 75 causes these count values to be summed to determine a total number of overflow events that have occurred for the application. The memory 74 also stores a threshold value. The processor 75 compares the threshold value to the total count of the overflow events. If the total count of the overflow events exceeds the threshold, this indicates that a tolerable level of overflow has been exceeded. The processor 75 may cause an alert to be triggered in response to determining that the total count of the overflow events has exceeded the threshold.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A processing device comprising:
an execution unit configured to execute instructions to perform arithmetic operations on input values represented according to a format, the format having a range of representable values extending between predefined limit values, the predefined limit values comprising a maximum positive value and a minimum negative value; and
a first register configured to store a count value indicating a number of times overflow events have occurred when the processing device performs the arithmetic operations,
wherein the execution unit is configured to, in response to performing a first of the arithmetic operations having a result which extends beyond one of the predefined limit values:
store a result value that is within the predefined limit values; and
cause the count value to be incremented.

2. The processing device as claimed in claim 1, wherein the stored result value is equal to one of the predefined limit values.

3. The processing device as claimed in claim 1, wherein each of the instructions is associated with a respective thread of a plurality of worker threads, wherein the execution unit is configured to, for each of the plurality of worker threads:
cause the count value to be incremented in response to a respective one of the arithmetic
operations associated with the respective thread, the respective one of the arithmetic operations having a result which extends beyond one of the predefined limit values.

4. The processing device as claimed in claim 3, wherein the execution unit is further configured to interleave execution of a supervisor thread with the plurality of worker threads, wherein the first register is a status register of the supervisor thread.

5. The processing device as claimed in claim 1, wherein the format is a first floating-point format consisting of one of:
an 8-bit floating point format;
a 16-bit floating point format; and
a 32-bit floating point format.

6. The processing device as claimed in claim 1, wherein the execution unit is configured to:
execute further instructions to perform further arithmetic operations using values represented according to a further format, the further format having a further range of representable values extending between further predefined limit values;
in response to performing a first of the further arithmetic operations having a further result which extends beyond one of the further predefined limit values:
store a further result value that is within the further predefined limit values; and
cause the count value to be incremented.

7. The processing device as claimed in claim 6, wherein the further format is a second floating point format consisting of one of:
an 8-bit floating point format;
a 16-bit floating point format; and
a 32-bit floating point format.

8. The processing device as claimed in claim 1, wherein the instructions are part of an application for performing training of a neural network.

9. The processing device as claimed in claim 1, comprising a second register, wherein the execution unit is configured to:
 support a thread configured to write to the second register; and
 in response to the write to the second register, clear the count value.

10. The processing device as claimed in claim 1, comprising a third register,
 wherein the execution unit is configured to:
 support a thread configured to write to the third register; and
 in response to the thread writing to the third register, enabling the incrementation of the count value in response to the arithmetic operations producing results which extend beyond the predefined limit values.

11. A processing system comprising a plurality of instances of a processing device, each processing device comprising:
 an execution unit configured to execute instructions to perform arithmetic operations on input values represented according to a format, the format having a range of representable values extending between predefined limit values; and
 a first register configured to store a count value indicating a number of times overflow events have occurred when the processing device performs the arithmetic operations,
 wherein the execution unit is configured to, in response to performing a first of the arithmetic operations having a result which extends beyond one of the predefined limit values:
  store a result value that is within the predefined limit values; and
  cause the count value to be incremented, wherein for each of the instances:
   the execution unit of the respective instance is configured to cause a current value of the respective count value to be exported from the respective instance of the processing device.

12. The processing system as claimed in claim 11, comprising a further processing device comprising:
 an interface configured to receive from each of the instances of the processing device, the respective count value for that instance; and
 at least one processor configured to sum the count values of the instances to determine a count of the number of overflow events in the processing system.

13. The processing system as claimed in claim 12, wherein the at least one processor is configured to compare the count of the number of overflow events in the processing system to a threshold.

14. The processing system as claimed in claim 12, wherein the further processing device is a host device.

15. The processing system as claimed in claim 11, wherein the plurality of instances of the processing device are configured to run an application to perform training of a neural network.

16. A method comprising:
 executing instructions to perform arithmetic operations on input values represented according to a format, the format having a range of representable values extending between predefined limit values, the predefined limit values comprising a maximum positive value and a minimum negative value; and
 storing in a first register, a count value indicating a number of times overflow events have occurred when the processing device performs the arithmetic operations, in response to performing a first of the arithmetic operations having a result which extends beyond one of the predefined limit values:
  storing a result value that is within the predefined limit values; and
  causing the count value to be incremented.

17. A non-transitory computer readable medium storing a set of computer readable instructions, which when executed by at least one processor causes a method to be carried out, the method comprising:
 executing instructions to perform arithmetic operations on input values represented according to a format, the format having a range of representable values extending between predefined limit values, the predefined limit values comprising a maximum positive value and a minimum negative value; and
 storing in a first register, a count value indicating a number of times overflow events have occurred when the processing device performs the arithmetic operations,
 in response to performing a first of the arithmetic operations having a result which extends beyond one of the predefined limit values:
  storing a result value that is within the predefined limit values; and
  causing the count value to be incremented.

* * * * *